3,592,665
VALENCIA ORANGE TREATMENT AND STORAGE SYSTEM
John R. MacRill, Ontario, Calif., and Malcolm H. Ellis, Yuma, Ariz., assignors to DVR Corporation
Filed Feb. 4, 1969, Ser. No. 796,408
Int. Cl. A23b 7/00, 7/16
U.S. Cl. 99—154                                 3 Claims

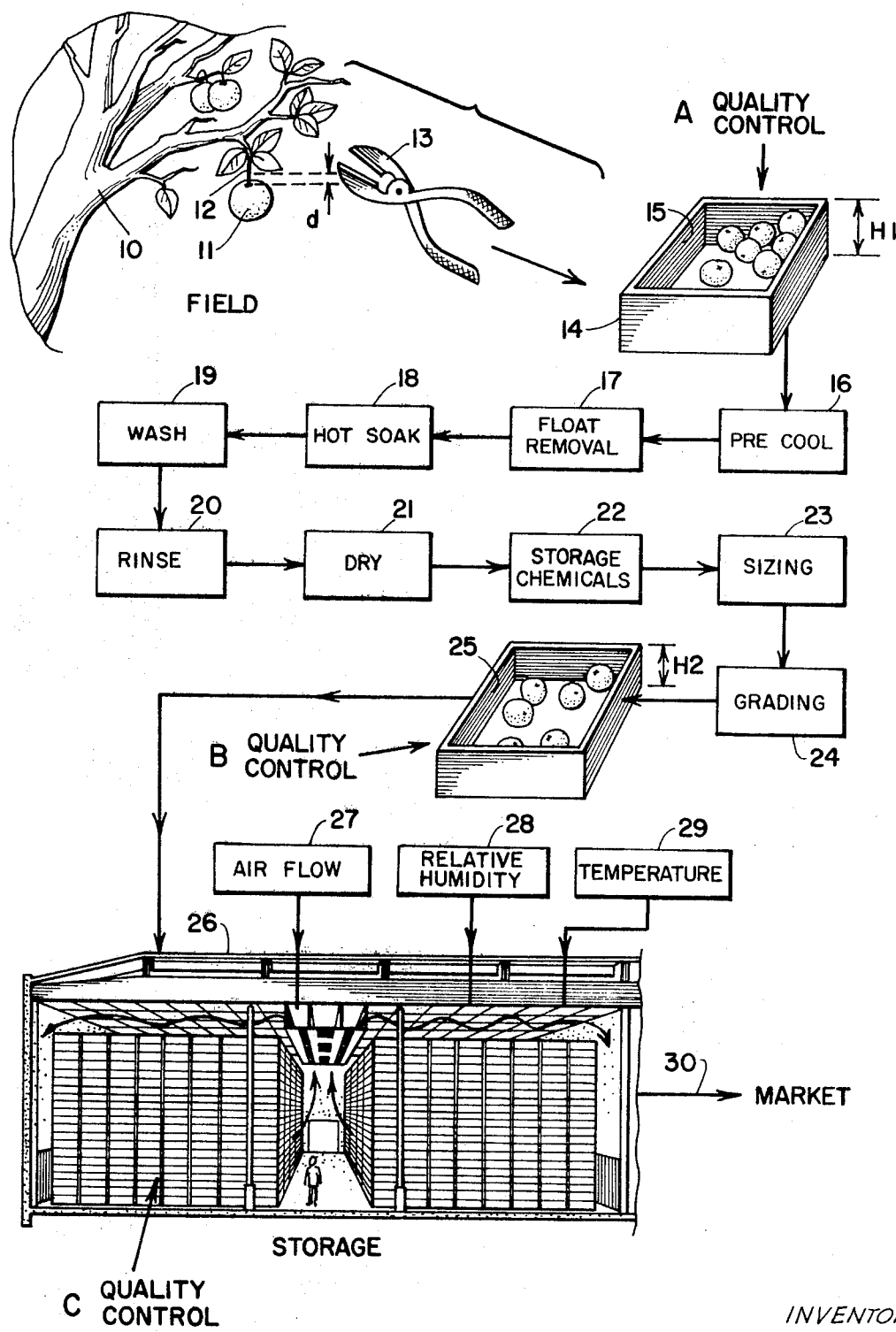

ABSTRACT OF THE DISCLOSURE

A process for treating Valencia oranges and storing the same in a manner such that high quality oranges may be shipped to a market place even during off season periods is described. The treatment process starts in the field and includes a series of steps of clipping the oranges, floating the oranges, soaking, washing, rinsing, drying, and chemically spraying the oranges preparatory to being stored. The storing process and facility therefor constitute placing of the oranges in an enclosure for a period of from one to eight months while maintaining within close tolerances a proper air circulation, relative humidity, and air temperature.

---

This invention relates generally to citrus processing and more particularly to an improved combination of treatment and storage steps and storage facilities for Valencia oranges grown in the desert areas of the western states.

BACKGROUND OF THE INVENTION

Treatment and storage processes for various types of citrus fruit are well known in the art. The highest quality fruit received in markets is generally that fruit which has recently been picked and properly transported to its destination of sale within as short a period as possible after picking. In other words, fruit in season is generally superior to fruit available at the market during an off or out-of-season period.

Since the demand for fruit by the market can be great at any time of the year, great efforts have been expended in research and development of storage facilities for fruit with the end in mind of storing a large inventory over a relatively long period so that a market demand for fruit can be met at any time whether in season or out-of-season. The particular conditions and manner in which fruit is stored to maintain a high quality product whatever time of year the same is shipped to markets are relatively critical. These conditions are not only peculiar to the time that fruit is picked; that is, its degree of ripeness, but in addition, the particular area in which the fruit is grown. For example, fruit grown in eastern or northern states is treated quite differently from fruit grown in desert areas such as in the western states.

The conditions and manner of treatment are also dependent upon the particular type of fruit; for example, exotics are treated differently from more conventional fruits and among the fruits themselves lemons, bananas, grapefruits, and oranges are all treated slightly differently. For each particular location, time of picking or harvesting, and type of fruit, there appear to be a particular set of conditions and manner of treatment which enable optimum quality to be realized in fruit shipped at arbitrary time intervals from a storage facility. Considerable research is required in every instance to determine the particular conditions and manner of treatment. Moreover, it is found that the various treatment steps are interdependent with the storage conditions. In this respect, if the treatment of a fruit during any particular process step starting with the exact manner in which the fruit is removed from the tree should vary, subsequent processing steps will be affected and must be altered as to certain conditions in order to realize the optimum quality in the end product.

While suitable conditions and manners of treatment of certain fruits such as lemons, bananas, and grapefruits have been discovered through diligent research such that it becomes feasible to store these fruits for relatively long periods to meet arbitrary market demands, oranges and particularly Valencia oranges have presented serious problems. It is found that attempting to treat and store Valencia oranges under the same conditions of air circulation, relative humidity, and temperature as that employed in storage facilities for the other mentioned types of fruits, failure in providing a high quality product at the time of shipping to the market inevitably results. In this respect, one of the critical factors appears to be the storage temperature. In the case of lemons, grapefruit, or bananas, a temperature of 55 to 60° in the storage facility will function to realize the necessary preservation of the quality of the fruit. Storing of Valencia oranges under such temperature conditions decreases the quality of the oranges to an unacceptable extent.

BRIEF DESCRIPTION OF THE PRESENT INVENTION

The present invention provides a treatment and storage process evolved after considerable experimentation, research, and development work peculiarly suited to Valencia oranges grown in desert areas of the western states. In essence, we have found that Valencia oranges harvested and treated in accord with a given series of process steps in a successive manner preparatory to storage and thence stored at a given temperature unexpectedly different from temperatures heretofore used for other types of fruit and in conjunction with a given air circulation and relative humidity enables the storage of such Valencia oranges for periods of one to eight months. During the period there does not result any change in the quality of the oranges regardless of the time that they are removed from the storage facility for shipment to the market which would be considered unacceptable.

As a consequence of the foregoing discoveries, Valencia oranges, for the first time, may be made available to the market at any time whether during the season, during an off season, or at any other time during the year.

In addition to the new combination realized when the various process steps are considered together, the present invention also contemplates the provision of a unique storage facility structure itself for use with properly treated Valencia oranges. This storage facility comprises an enclosure with means for controlling air circulation, relative humidity, and temperature in such a manner as to assure a maintenance of high quality oranges throughout the storage period.

BRIEF DESCRIPTION OF THE DRAWING

A better understanding of the Valencia orange treatment and storage system of the present invention will be had by referring to the accompanying drawings, in which:

The single figure schematically represents a series of treatment steps together with a storage facility in accord with the present invention.

DETAILED DESCRIPTION OF THE INVENTION

Referring to the upper portion of the drawing, there is illustrated a portion of a Valencia orange tree 10 including ripened oranges such as indicated at 11 on the ends of stems such as indicated at 12. The variety of Valencia oranges under consideration are those that are grown in the desert areas of the western states of the United States.

In the first step of the treatment process, the oranges are clipped from the trees by specially designed clippers such as indicated at 13. The manner in which the oranges are removed from the trees is extremely important. In this respect, it is to be understood that a clipping procedure is utilized as opposed to a shearing of the stem of the orange such as would occur with scissors. Further, the clipping should be square; that is, the clipper blades should enter the stem at right angles to the stem axis i.e. normal thereto. Moreover, it is impoortant that the orange stem be clipped at a point adjacent to the orange button in a manner to leave no more than one-eighth inch of stem on the orange. If the orange stem is not clipped but rather sheared or, if the orange itself is simply pulled from the tree in such a manner that the entire stem is removed from the orange button, subsequent chemical, biological and/or pathlological deterioration of portions of the orange in th vicinity of the orange button can be accelerated to an extent that the final quality of the orange is unacceptable.

After clipping oranges from the trees as described, they are transferred to a field bin 14 as indicated by the arrow. Preferably, these bins are interiorly padded as at 15 to minimize any possible bruising of the oranges when placed in the bin. The depth of the field bins employed for collecting the oranges for subsequent transportation to a treatment site is important. This depth is indicated at H1 in the drawing and must not exceed two feet. If oranges are piled on top of one another for a depth greater than two feet, the undue pressures and interference with each other and the lessening of proper air circulation for the oranges on the bottom of the bin can be detrimental to ultimate quality.

Of course, it is important to avoid any bruising of the oranges when collecting the oranges in the field bins. Such bruising is not only prevented by employing shallow bins; that is, bins of less than two foot depths as described but also by assuring that each bin is free of any foreign objects which could cause bruising of the fruit.

The foregoing remarks also apply, of course, to the pickers' bag ordinarily carried by the picker when clipping the fruit. This bag is not shown but may be of a conventional type. It is important, as in the case of the oranges collected in the field bins that the oranges themselves not be stacked to a depth greater than two feet within the pickers' bag.

After the step of collecting the oranges in field bins has been completed, the oranges are subjected to a precooling process at the treatment site. This treatment site may be in an area at the particular field or at another site to which the oranges are transported wherein further processing steps can be carried out. The pre-cooling of the oranges, wherever carried out, is important and in this respect the pre-cooled temperature must be less than 80° F. The pre-cooling operation itself may be carried out while the oranges are still in the field bins. This step in indicated by the block 16 in the drawing.

After pre-cooling, the oranges are floated out of the field bins for subsequent processing as indicated at 17. This float removal is accomplished by simply submerging the field bins below a water level so that the oranges float free in a gentle manner. It is important that the oranges commence subsequent processing, the first step of which is the floating of the same from the bins within 48 hours from the time that they are clipped from the trees.

In accord with the next step of the treatment, the floated oranges undergo a hot soaking process indicated by the block 18. This soaking is achieved by submerging the oranges in a hot soaking alkaline liquid at a temperature of from 105 to 110° F. for a period of four minutes. The alkalinity of the liquid may be provided by mixing with water a liquid soap and soda ash; for example, a one and one-half percent solution.

After the hot soak, the oranges are washed, rinsed, and dried as indicated by the successive blocks 19, 20, and 21 in the drawing. The washing step is carried out by automated machinery including soft bristled brushes which engage the surfaces of the oranges for a period of approximately 20 to 30 seconds while simultaneously, water is caused to rain down on the oranges. Rinsing is achieved by further subjecting the oranges to a raining rinse water and the drying step can be achieved by passing the oranges over sponge rubber rollers or if preferred, circulating air over the oranges. The oranges are preferably dried to only a damp-dry condition.

In the next step of the process, the oranges are subjected to a treatment by storage chemicals as shown at 22. These chemicals may be applied to the oranges as by spraying while the oranges are moved along suitable rollers. The storage chemicals include a non-cosmetic wax to replace natural wax lost during the prior processing steps.

After this chemical treatment, the oranges may be collected in storage bins preparatory to storing the same in a storage facility. Preferably, however, intermediate steps constituting sizing as indicated at 23 and grading as indicated at 24 are carried out. These steps, however, are not essential in the overall treatment. The sizing step simply constitutes separating the oranges according to size ranges (diameters). Oranges within the various sized ranges may then be placed in selected storage bins, after grading, according to their size. Grading of the oranges after the sizing step is carried out by visual and tactual examination of the oranges to determine the presence of any serious external or internal damage. Oranges having an external and/or internal damage must be removed prior to storing of the oranges. Grading may also consist of separating oranges according to color.

As indicated in the drawing, the storage bins such as 25 are of a special design having a depth as indicated at H2 no greater than one foot. These bins, as in the case of the field bins, are free of any foreign objects or internal sharp corners and are preferably padded. In actual conveyor machinery for loading the bins, it is very important that the oranges do not fall into the bins and strike the bottom padded surface through a distance any more than four inches maximum.

After the bins such as the bin 25 have been filled with oranges, they are transported as rapidly as possible to a storage facility. One such storage facility is shown at 26 in the lower portion of the drawing. As indicated schematically, several hundreds of the storage bins may be kept under a single enclosure. While not indicated in the drawing, the respective bins are supported in spaced relationship to assure the proper air circulation over the individual bins can be realized. It is vitally important that the placing of the bins in the storage facility be carried out in such a manner that no dead air areas will result.

The storage period within the storage facility enclosure may vary from one to eight months. During this period, and in accord with important process steps of the present invention, three conditions must be maintained.

First, fresh air must be maintained in circulation in the facility at a rate of from 22 to 30 cubic feet per minute for every 1,000 pounds of oranges stored, and preferably at about 26 to 27 cubic feet per 1,000 pounds.

Such air circulation is indicated by the black arrows in the storage facility 26. Second, the relative humidity of the circulated air should be from 85 to 90%. Preferably, the relative humidity should be maintained at the 90% level. Third, and of vital importance, is the maintaining of the temperature within the facility between 44 and 49° F. The respective maintenance of these three conditions is indicated by the blocks 27, 28, and 29 respectively.

Under the foregoing conditions, the high quality of the oranges can be maintained for periods up to eight months as mentioned heretofore.

The final step of the treatment involves the preparation of oranges for transportation to the market. Thus at a demand period, one or more of the storage bins is selected from the storage facility and raised in temperature to about 65° F. The raising of the oranges to this temperature must be carried out gradually and it is found that if the temperature is linearly raised over a period of eight hours from the temperature of 45° F. in the storage facility to the desired 65° F. while still maintaining air circulation at the rate of 26 to 27 cubic feet per minute for every 1,000 pounds of oranges and the relative humidity at from 85 to 90%, the oranges are properly conditioned for conventional packing for shipment to the market. This latter step is indicated by the arrow 30.

Throughout the various treatment steps discussed above, it is very desirable to conduct quality control studies. A minimum of three such studies should be made on the oranges during the various steps from the time the oranges are first clipped to the time they are shipped to market.

The first quality control test takes place in the field preferably after the step of clipping of the oranges from the trees and before the step of pre-cooling the oranges. This quality control test is indicated at A in the drawing. The next quality control test should take place after chemical spraying and before the step of storing in the storage facility. If sizing and grading steps are included, this second quality control test would follow these steps as indicated at B in the drawing. The third quality control test would be carried out after storage of at least three weeks in the storage facility and before shipment to the market. This last quality control step is indicated at C in the drawing.

In each of the quality control tests, a number of random oranges are selected for test purposes. In the case of the first quality control test A at the field, a large enough number of oranges are selected to be representative but not so many that testing of each becomes unfeasible with respect to time. Normally, from one-tenth of one percent to one one-hundredth of one percent of the oranges collected in the field are sufficient. It should be understood that while only three quality control tests at various points during the process have been indicated, further quality control tests may be made at periodic intervals such as just prior to shipping to market or at intermediate periods during storage, or after certain of other steps in the pre-storage treatment.

The quality control tests conducted at the indicated intervals are substantially the same. Essentially, the sample random oranges selected are tested as to granulation, sunburn, frost damage, dry sac, and similar types of physical damage. In this respect, a series of cuts are effected on the orange. In addition, a juice test is carried out wherein the acidity, brix, and other characteristics are evaluated. Finally, the percentage of juice content by weight is determined and noted for the selected oranges. Preferably a scale of 0 to 9 is utilized to indicate qualitatively the quality of the tested oranges. A rating of 0 indicates the poorest results in the quality test while a rating of 9 indicates the best. Other numerals between 0 and 9 indicate the degree of quality of the particular orange tested.

Suitable index cards are provided for the various quality control tests wherein identifying information is provided such as the particular lot of oranges tested, the color wherein color grading has been carried out and any other pertinent information.

When Valencia oranges grown in the desert areas of the western states are treated in the foregoing described manner and stored under the conditions set forth, it is found that the Valencia oranges can be properly preserved for sufficient periods that any market demand regardless of the time of year can readily be met. The present invention accordingly, has provided for the first time a complete system for the treating and storing of Valencia oranges wherein the various advantages realizable heretofore with other types of fruit are completely realized.

What is claimed is:

1. A treatment and storage process for Valencia oranges grown in desert areas of the western states, including, in combination, the successive steps of:
   (a) clipping each orange from trees in a direction substantially normal to the stem direction and at a point adjacent to the orange button such that less than one-eighth of the stem remains on the orange;
   (b) collecting the orange in field bins each of depth no greater than two feet for transportation to a treatment site;
   (c) pre-cooling the oranges while retained in the bins at the treatment site to a temperature less than 80° F.;
   (d) floating the oranges out of the field bins for subsequent processing by submerging the bins in water so that the oranges therein float free in a gentle manner said oranges being floated from said bins within a period of 48 hours from the time they are clipped from said trees;
   (e) soaking the oranges by submerging them in a hot aqueous soda ash solution at a temperature of from 105 to 110° F. for a period of four minutes;
   (f) washing the oranges by brushing them with soft bristle brushes for a period of 20 to 30 seconds and simultaneously raining water over the oranges;
   (g) rinsing the oranges after washing by passing them under a rain of rinsing water;
   (h) drying the oranges to a damp dry condition;
   (i) spraying the oranges with wax to replace natural wax lost during prior processing steps;
   (j) collecting the oranges in storage bins each of a depth approximately 4 inches and no greater than one foot;
   (k) storing said oranges in said storage bins in a storage facility for a period of from one to eight months and during said period
      (1) maintaining an air circulation of fresh air in said facility of 26 to 27 cubic feet per minute for every 1,000 pounds of oranges stored;
      (2) maintaining a relative humidity of said air of from 85 to 90%;
      (3) maintaining the temperature of said facility between 44° and 49° F.; and
   (l) selecting one or more storage bins from said storage facility when required for shipment to market and raising the temperature thereof over a period of eight hours to about 65° F. under an air circulation of 26 to 27 cubic feet per minute for every 1,000 pounds of oranges and a relative humidity of 85 to 90% prior to packing the oranges for shipment.

2. The process of claim 1, including the additional steps of:
   (a) sizing said oranges by separating oranges according to size ranges prior to the step of placing the same in said storage bins; and
   (b) grading said oranges after sizing of the same to eliminate damaged oranges from being stored in said storage bins and to further separate the oranges according to color.

3. The process of claim 1, including the additional steps of conducting quality controlled tests on randomly selected orange.
  (a) after the step of clipping of the oranges from the trees and before the step of pre-cooling the oranges;
  (b) after the step of spraying the oranges with storage chemicals and before the step of storing in the storage facility; and
  (c) after storage of at least three weeks in said facility and before shipment to market.

References Cited

UNITED STATES PATENTS

| | | | |
|---|---|---|---|
| 1,578,218 | 3/1926 | Thompson | 99—154 |
| 1,732,180 | 10/1929 | Brogden | 99—239 |
| 2,191,695 | 2/1940 | Holzman | 99—154 |
| 2,489,743 | 11/1949 | Brogden | 99—168 |
| 2,739,897 | 3/1956 | Toulmin | 99—103X |

FOREIGN PATENTS

| | | | |
|---|---|---|---|
| 457,888 | 12/1936 | Great Britain | 99—154 |

OTHER REFERENCES

Citrus Fruits Refr. Data Book, 2nd edit (1946), MacRill et al. Treatise, pp. 146–160 incl.

NORMAN YUDKOFF, Primary Examiner

F. E. DRUMMOND, Assistant Examiner

U.S. Cl. X.R.

99—239, 204